R. F. BAERLOCKER.
CONTROLLER FOR ELECTRIC MOTORS.
APPLICATION FILED DEC. 24, 1909.

969,509.

Patented Sept. 6, 1910.
3 SHEETS—SHEET 1.

WITNESSES:
C. L. Belcher
Otto J. Schairer

INVENTOR
Robert F. Baerlocker
BY Wesley G. Carr
ATTORNEY

R. F. BAERLOCKER.
CONTROLLER FOR ELECTRIC MOTORS.
APPLICATION FILED DEC. 24, 1909.

969,509.

Patented Sept. 6, 1910.

WITNESSES:
C. L. Belcher
Otto S. Schairer

INVENTOR
Robert F. Baerlocker
BY
ATTORNEY

UNITED STATES PATENT OFFICE.

ROBERT FRIEDERICH BAERLOCKER, OF MANCHESTER, ENGLAND, ASSIGNOR TO WESTINGHOUSE ELECTRIC AND MANUFACTURING COMPANY, A CORPORATION OF PENNSYLVANIA.

CONTROLLER FOR ELECTRIC MOTORS.

969,509.  Specification of Letters Patent.  Patented Sept. 6, 1910.

Application filed December 24, 1909. Serial No. 534,751.

*To all whom it may concern:*

Be it known that I, ROBERT FRIEDERICH BAERLOCKER, a citizen of Switzerland, and a resident of Manchester, England, have invented a new and useful Improvement in Controllers for Electric Motors, of which the following is a specification.

My invention relates to controllers for electric motors and more particularly to what are known as "oil-immersed" controllers.

As hitherto constructed, in order to inspect the internal parts of such controllers, it has been necessary to lift such parts out of the oil-containing tank, generally formed by the casing of the controller, and to enable this to be done, the leads from the line, motor, resistances or transformers have either been disconnected or left in the form of loops of sufficient length to allow of the parts being moved the desired distance.

The above disadvantages are obviated, according to the present invention, by arranging the controller drum or drums to rotate upon a horizontal axis within a casing which forms the tank for the oil in which the various circuits are made and broken when the controller is operated, the drum or drums, the fingers coöperating therewith and the operating mechanism being mounted on the lid of the casing. Suitable switches are interposed between the controller fingers and terminals fixed to the lower part of the casing to which the leads from the line, motors, resistances, etc. are connected, the said switches being adapted to be closed to complete the circuits from the leads to the controller fingers only when the lid of the casing is closed.

One manner of carrying the invention into effect is illustrated in the accompanying drawings, in which—

Figure 1:
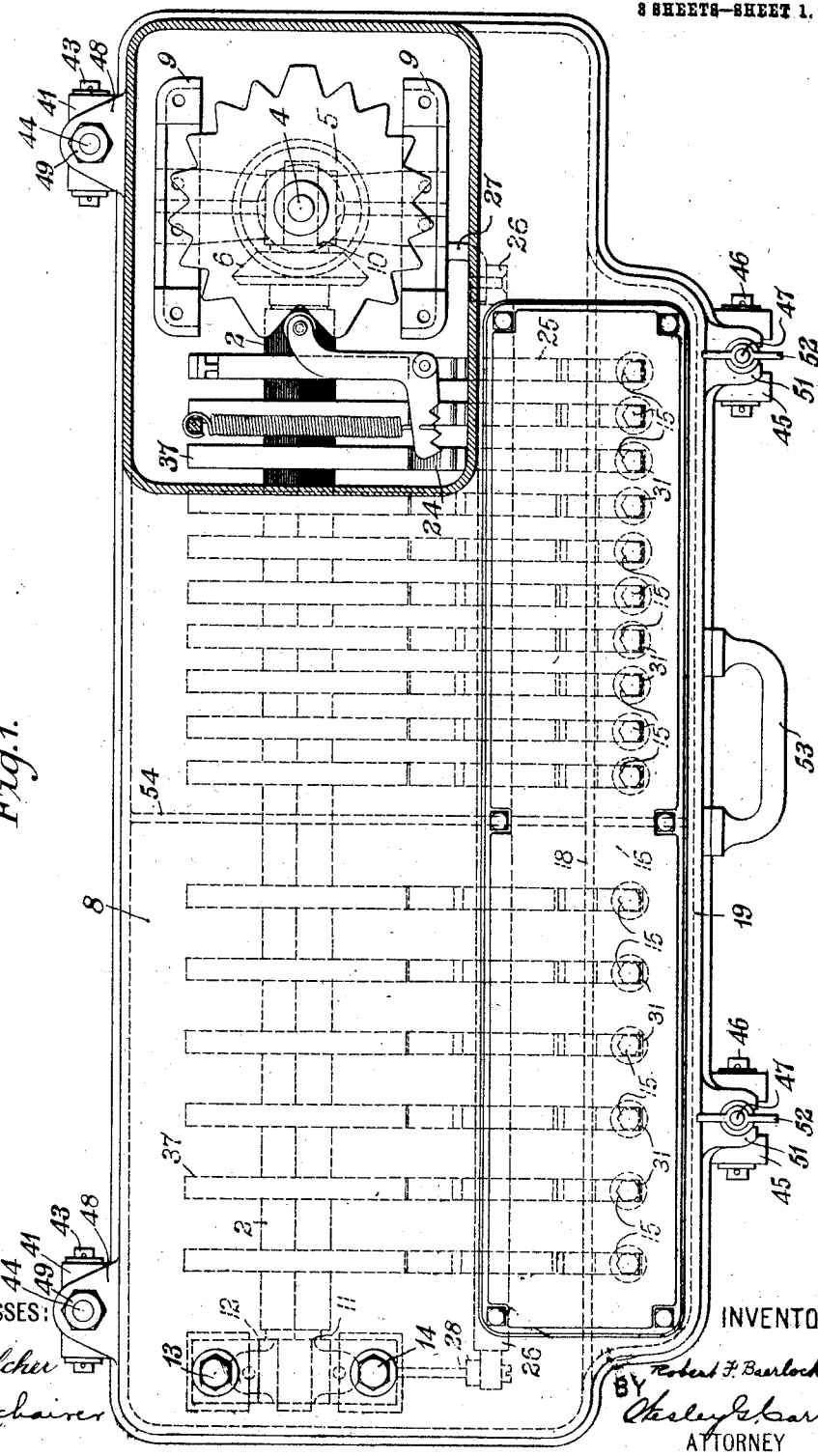
Figure 2:
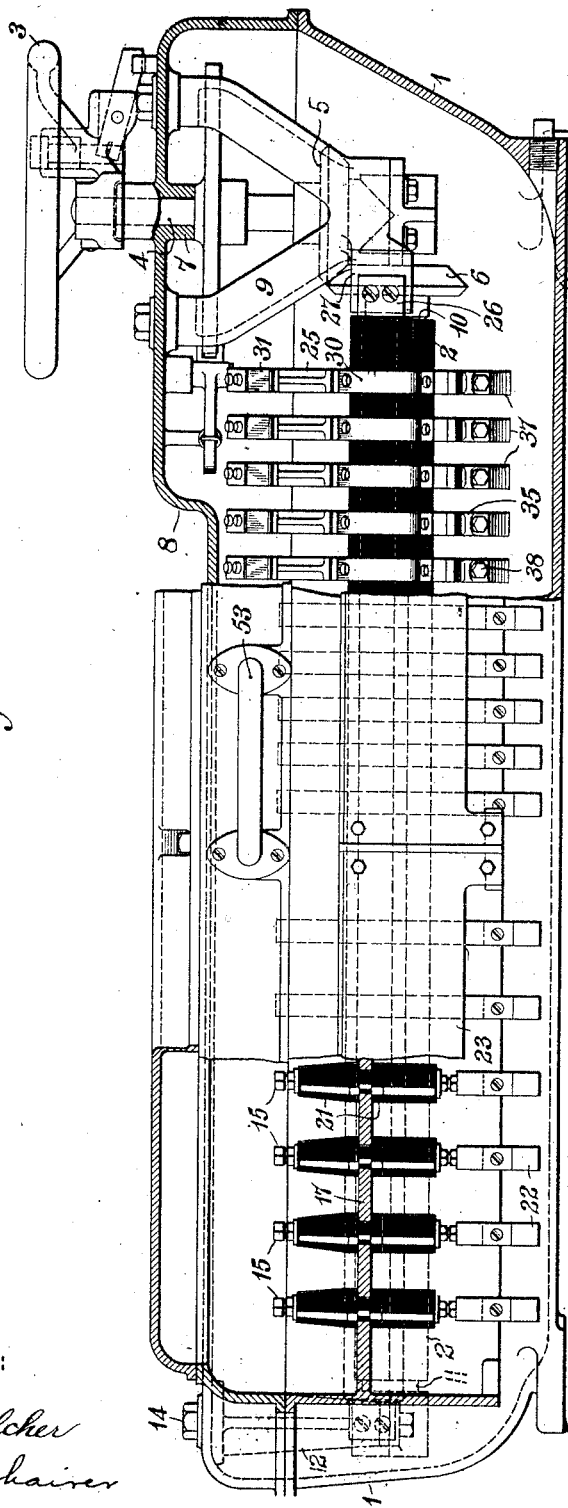
Figure 3:
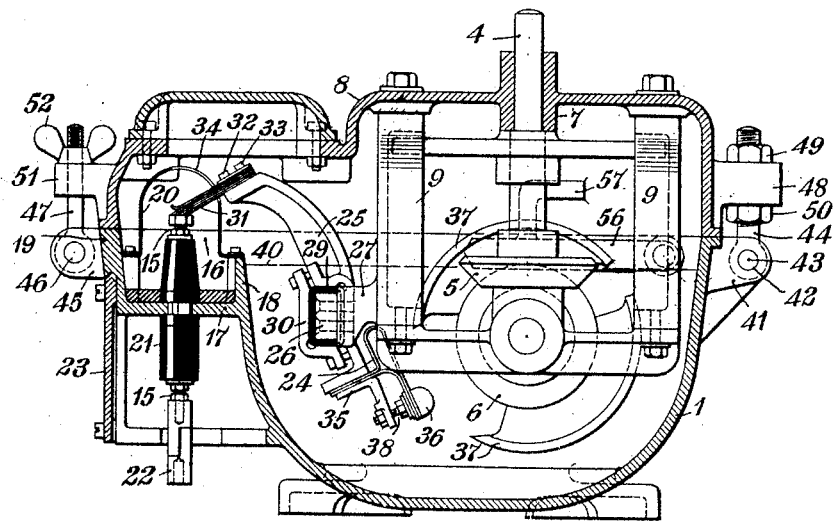

Figure 1 is a plan view of a controller with the lid of the casing closed, the end part of the latter being in section to disclose the actuating mechanism. Fig. 2 is a side elevation of the controller shown in Fig. 1, with the end portions of the casing broken away and shown partly in section. Fig. 3 is an end view of the controller with the casing shown in section to disclose the working parts.

Referring to the drawings, 1 is the controller casing which constitutes an oil tank, and 2 is a drum mounted therein, so that its axis is horizontal. The drum 2 may be rotated by means of a hand wheel 3 upon a vertical shaft 4 through beveled gearing 5 and 6, the shaft 4 being journaled at its upper end in a bearing 7 in the lid 8 of the controller casing, and at its lower end in a step bearing carried by the bracket 9 which is secured to the lid 8, as is best shown in Figs. 2 and 3. In the bracket 9 is also arranged a bearing for one end 10 of the controller drum, the other end 11 of the latter having a bearing in a bracket 12 which is also supported from the lid 8 to which it is secured by nuts 13, 14, as shown in Figs. 1 and 2.

In order to connect the supply and work circuits to the controller, I provide a series of fixed terminals 15, preferably in a separate compartment 16 of the casing. As shown in Fig. 3, the compartment 16 is formed by flanges 17, 18 of the casing, an outer wall 19, and an insulating covering 20. The insulating cover 20 need extend over the line leads only, since the motor leads are "dead" when the cover is opened.

Referring to Fig. 3, each terminal 15 is secured to the flange 17 of the controller casing, and is mounted upon an insulator 21, preferably of porcelain, which is firmly fixed and sealed into the casing. The lower ends of the terminals 15 are electrically connected to the supply or work circuits by connecting thimbles 22, or other suitable means, and may be inclosed by removable covers 23. The upper ends of the fixed terminals 15 are normally maintained in electrical connection with the controller fingers 24, by means of switch arms 25, which are rigidly secured to the other parts mounted upon the lid or cover 8, in a manner which will now be described. A bar 26, of steel or other suitable material, is screwed at one end to a projecting part 27 on the bracket 9, and at the other end to a projecting arm 28 on the bracket 12 (Fig. 1). The switch arms 25 are constructed of a good conducting metal, being suitably formed by casting or otherwise, and each is provided with a recess 29 which is adapted to fit over the bar 26 to which it is rigidly secured by a clamp 30, the switch arms being insulated from the bar 26, preferably by mica, as shown in Fig. 3. The upper end of each arm 25 is adapted to receive a laminated copper brush 31 which is clamped thereto by screws 32 and 33, the arm being so dimensioned that when the lid 8 is in closed position the brush 31 extends through an opening 34 in the insulating covering 20 of the separate compartment 16, and presses firmly upon the exposed upper surface of a fixed terminal 15. At the lower end of each arm 25, a spring finger 24 of copper or other good conducting material is located, it being secured in electrical connection therewith by any suitable means, as, for instance, by a clamp 35, as shown in Fig. 3, and the contact piece 36 of each finger is given a certain amount of play for engaging the contact strips 37 on the controller drum 2, the amount of play being adjustable by means of a screwed projection 38 extending from the back of the contact piece 36 through a hole in a part of the clamp 35 and carrying an adjusting nut 39.

By the arrangement described and with the lid 8 closed, as shown by full lines in Fig. 3, it will be seen that the controller fingers 24 are in electrical connection with the supply and work circuits through the switch arms 25, laminated copper brushes 31, and fixed terminals 15. The controller fingers 24, drum 2, and actuating gearing 5, 6, are normally immersed in oil in the casing 1, the oil level being indicated by dotted line 40 in Fig. 3. At the back of the casing two projections 41 are formed, one near each end, each being provided with a hole 42, to receive a pivot pin 43, upon which the ring headed bolt 44 is adapted to hinge (Figs. 1 and 3), and similar projections 45, pivot pins 46, and ring-headed bolts 47 are provided on the front side of the casing.

On the rear side of the lid 8, two lugs 48 are provided to fit, respectively, over the shank of a ring-headed bolt 44 upon which the lug is adjusted and clamped by means of bolts 49, 50, so as to make a tight joint with the edge of the casing when the lid is closed. On the front side of the lid, split projections 51 are provided to receive the ring-headed bolts 47, the lid being pressed firmly down by means of thumb-screws 52; but it is evident that the lid may be secured to the casing by any other means which will normally make a tight joint between these two parts.

When it is desired to inspect or repair any part of the controller normally immersed in oil, it is only necessary to slacken the thumb-screws 52 and raise the lid by the handle 53 into the open position, in which position it may be conveniently held by the pivoted strut 56 which engages a notch 57 in the lid. The controller fingers 24 are thus disconnected from the outer circuits by reason of the separation of the copper brushes 31 from the fixed terminals 15 and, at the same time, the operative parts are raised from the oil and exposed to view and can be handled without disconnecting any of the circuit wires from the fixed terminals 15 on the controller casing. On again closing the lid 8, the copper brushes 31 are brought into contact with the terminals 15 and the controller is again placed in electric connection with the supply and work circuits ready for use.

For high tension circuits, it is advisable to separate the primary from the secondary terminals by means of a partition in the controller casing, such a partition being shown in dotted lines in Fig. 1 and designated by the numeral 54.

I claim as my invention:

1. The combination with an oil-containing tank provided with external circuit contact terminals, of a removable cover for said tank and an electric controller mounted upon said cover and having contact devices which engage the tank contact terminals when the cover is in its normal position on the tank.

2. The combination with an oil-containing tank having contact terminals at one side thereof of a cover hinged to said tank, and a controller supported by said cover and provided with contact terminals which engage the tank contact terminals when the cover is in its normal closed position.

3. The combination with a tank having a plurality of contact terminals, of a removable cover for said tank and a controller suspended from said cover with its axis parallel thereto and having circuit making and breaking devices to engage the tank contact terminals when the cover is in normal position.

4. The combination with a tank having a main compartment and a supplemental compartment and provided with contact terminals in the supplemental compartment, of a removable cover, and a controller suspended from said cover and having circuit making and breaking devices to engage the tank contact terminals when in normal position.

5. The combination with a receptacle comprising a body portion and a removable cover, of a controller suspended from the cover and a circuit making and breaking switch, the respective members of which are supported by the body portion and by the cover.

In testimony whereof, I have hereunto subscribed my name this 9th day of December, 1909.

ROBERT FRIEDERICH BAERLOCKER.

Witnesses:
JAS. STEWART BROADFOOT,
H. R. KITSON.